United States Patent
Bouyssoux et al.

(10) Patent No.: US 12,505,543 B2
(45) Date of Patent: Dec. 23, 2025

(54) METHOD FOR IDENTIFYING ABNORMALITIES IN CELLS OF INTEREST IN A BIOLOGICAL SAMPLE

(71) Applicants: VitaDX INTERNATIONAL, Rennes (FR); INSTITUT PASTEUR, Paris (FR)

(72) Inventors: Alexandre Bouyssoux, Paris (FR); Riadh Fezzani, Montrouge (FR); Florent Couzinié-Devy, Montrouge (FR); Thibaut Troude, Paris (FR)

(73) Assignees: VitaDX INTERNATIONAL, Rennes (FR); INSTITUT PASTEUR, Paris (FR)

( * ) Notice: Subject to any disclaimer, the term of this patent is extended or adjusted under 35 U.S.C. 154(b) by 330 days.

(21) Appl. No.: 18/314,482

(22) Filed: May 9, 2023

(65) Prior Publication Data

US 2024/0378720 A1    Nov. 14, 2024

(51) Int. Cl.
*G06V 20/69* (2022.01)
*G06T 7/00* (2017.01)

(52) U.S. Cl.
CPC .......... *G06T 7/0012* (2013.01); *G06V 20/698* (2022.01); *G06T 2207/20081* (2013.01); *G06T 2207/30024* (2013.01)

(58) Field of Classification Search
CPC . G06T 2207/10056; G06T 2207/20081; G06T 2207/20084; G06T 2207/30024; G06T 7/0012; G06V 10/82; G06V 20/698
See application file for complete search history.

(56) References Cited

U.S. PATENT DOCUMENTS

| | | | |
|---|---|---|---|
| 11,663,838 B2* | 5/2023 | Rothrock | G16H 15/00 382/133 |
| 12,118,715 B2* | 10/2024 | Courtiol | G06V 10/82 |
| 2009/0299640 A1* | 12/2009 | Ellis | C12Q 1/6886 702/19 |
| 2019/0370965 A1* | 12/2019 | Lay | G06N 20/00 |
| 2020/0066407 A1* | 2/2020 | Stumpe | G06T 7/0012 |
| 2020/0250398 A1* | 8/2020 | Courtiol | G06V 10/82 |

(Continued)

OTHER PUBLICATIONS

European Search Report issued on Nov. 9, 2023, in corresponding European Application No. EP 23172455.0; 1 page.

(Continued)

*Primary Examiner* — Tsung Yin Tsai
(74) *Attorney, Agent, or Firm* — Maier & Maier, PLLC

(57) ABSTRACT

A computer-implemented and a device for analysis of a digital cytology slide of a biological sample. The biological sample having been previously collected from a subject suspected to be suffering from bladder cancer, the device including: at least one input configured to receive at least one digital cytology slide obtained from the biological sample; at least one processor configured to: detect cells of interest from the at least one digital cytology image; for each cell of interest, compute a features vector including at least one feature calculated on each cell of interest; define a bag of k instances for each digital cytology slide; calculating a global prediction score representative of a probability of presence of bladder cancer and/or a stage of bladder cancer for the subject; at least one output configured to provide the global prediction score.

14 Claims, 4 Drawing Sheets

(56) References Cited

U.S. PATENT DOCUMENTS

| | | | |
|---|---|---|---|
| 2021/0166387 A1* | 6/2021 | Chatterjea | G06T 7/0012 |
| 2021/0225513 A1* | 7/2021 | Manrai | G16H 50/20 |
| 2022/0084660 A1* | 3/2022 | Georgescu | G16H 30/20 |
| 2022/0139533 A1* | 5/2022 | Rothrock | G06T 7/194 |
| | | | 382/133 |
| 2022/0188573 A1* | 6/2022 | Liu | G06V 10/267 |

OTHER PUBLICATIONS

Bouyssoux et al., "Ensemble Multiple Instance Learning for Bladder Cancer Diagnosis", IEEE 20th International Symposium on Biomedical Imagin (ISBI), Apr. 18, 2023, 5 pages.

\* cited by examiner

METHOD FOR IDENTIFYING ABNORMALITIES IN CELLS OF INTEREST IN A BIOLOGICAL SAMPLE

FIELD

The present invention relates to the field of Whole Slide Image (WSI) analysis, and more particularly to detection of abnormalities in biological samples. Especially, the present invention relates to detecting cell abnormalities in a biological sample, preferably a urinary sample. More specifically, the invention relates to a method for predicting the histology outcomes from cytological slides.

BACKGROUND

Whole slide image analysis (WSI) is a digital pathology technique that involves the scanning of glass slides containing tissue samples and converting them into high-resolution digital images. These digital images can be viewed, analyzed, and processed using computer algorithms and software.

WSI enables pathologists and researchers to examine large tissue samples in detail, without the limitations of traditional microscopy. It allows for quantitative analysis of tissue features and can aid in the diagnosis, prognosis, and treatment of various diseases, including cancer.

As a non-invasive approach, cytopathology of urine sediment is a promising approach for diagnosing bladder-related disorders or diseases. However, computing a WSI from a urine slide is an uneasy task, as it required to recognize and identify abnormalities in a high number of elements, including various types of cells, casts, crystals, bacteria, yeast etc.

Moreover, the computing tools used from now are generally giving a yes/no answer on a suspicion of cancer.

In the bladder cancer, it is of high interest to distinguish and sort a WSI of a urine sample in order to determine the presence or absence of abnormalities in urothelial cells, but also if these abnormalities lead to the suspicion of a low-grade bladder cancer or a high-grade cancer.

Low-grade bladder cancer is a type of non-invasive bladder cancer that grows slowly and is less likely to spread to other parts of the body. It is often less aggressive and may recur but is less likely to progress to muscle-invasive disease. Low-grade bladder cancer is usually treated by removing the tumors through transurethral resection, followed by close monitoring and surveillance to detect any recurrence.

High-grade bladder cancer, on the other hand, is a more aggressive and invasive form of bladder cancer that grows quickly and has a higher risk of spreading to other parts of the body, particularly if left untreated. It is more likely to recur and progress to muscle-invasive disease, which can be life-threatening if not treated promptly.

The grading of bladder cancer is based on the appearance of cancer cells under a microscope, which are categorized into low-grade or high-grade based on their level of abnormality, with high-grade cells being more abnormal and aggressive. Determining the grade of bladder cancer is important for the medical team to design a therapeutical strategy for the patient.

This invention aims at helping the medical team in having a prompt and accurate information on the next step to be taken. Especially, this invention helps predicting the outcome of an endoscopy of the patient's bladder, and help monitoring the patient in an optimal way.

SUMMARY

This invention thus relates to a device for analysis of a digital cytology slide of a biological sample, said biological sample having been previously collected from a subject suspected to be suffering from bladder cancer, said device comprising:
- at least one input configured to receive at least one digital cytology slide obtained from a digitalization of at least one Whole Slide Image (WSI) of said biological sample;
- at least one processor configured to:
  - detect cells of interest from said at least one digital cytology image;
  - for each cell of interest, compute a features vector comprising at least one feature calculated on each cell of interest;
  - define a bag of k instances for each digital cytology slide; wherein the k instances are selected, based on at least one feature of said features vectors, as the cells of interest being the highest atypia cells among the cells of interest detected for each digital cytology slide;
  - calculating a global prediction score representative of a probability of presence of bladder cancer and/or a stage of bladder cancer for said subject; said global prediction score being obtained from a combination of single prediction scores obtained from at least two multi-instance leaning methods configured to receive as input said at least one defined bag;
- at least one output configured to provide said global prediction score.

Advantageously, the device of the present invention relies on a-priori selection of the most atypical cells and an ensembling of Multiple Instance Learners to predict diagnosis. Besides the computational interest of selecting the most atypia cells of interest this approach is advantageous as, in both positive and negative slides, sufficient information is contained in the "most positive" instances. For positive slides, healthy cells tends to be removed from the analysis, increasing attention on atypical cells of interest. On the other hand for negative slides, more importance is given to slightly atypical but healthy cells of interest, acting as hard-mining which could help reduce false positives According to other advantageous aspects of the invention, the device comprises one or more of the features described in the following embodiments, taken alone or in any possible combination.

According to one embodiment, the at least one digitalized cytology images is obtained from at least one WSI being colored with Papanicolaou. This embodiment advantageously allows to obtain isolated stained foreground objects easily identifiable from the background.

According to one embodiment, the detection of the at least one cell of interest is performed using a trained Res-Net model configured to receive as input at least one pre-processed portion of the WSI, and provide as output an identification and a classification of objects present in said at least one pre-processed portion of the WSI as belonging or not to at least one class of cells of interest.

In one example, the Res-Net model is ResNet-18 model which is trained to classify all foreground objects crops into 5 classes: basal urothelial cells (BUCs), superficial urothelial cells, conglomerates (at least two touching objects), polynuclear neutrophils and others, based on more than 25,000 annotated crops. In the present invention the cells of interest are the basal urothelial cells (BUCs), and the other object classified may be discarded.

According to one embodiment, the at least one feature comprised in the features vector are selected among: Nuclear-Cytoplasm Ratio (NCR), Nucleus Intensity, Nucleus Intensity standard deviation, Haralick's Energy, Entropy, Homogeneity, convex-hull ratio and/or nucleus circularity.

According to one embodiment, the at least one feature is Nuclear-Cytoplasm Ratio (NCR) and wherein the selection of k cells of interest comprises:
  sorting the cells of interest by decreasing Nuclear-Cytoplasm Ratio values; and
  select the first k cells of interest, representative of high atypia basal urothelial cells.

This embodiment advantageously, focuses on the Nuclear-Cytoplasm Ratio (NCR) which is, according to the Paris System, the most important criterion for BUCs atypia.

According to one embodiment, in cases where the slide contains less than k BUCs, all BUCs are selected and the bag is zero padded to keep the bag size constant.

According to one embodiment, the computation of the features vector comprises a preliminary segmentation of the detected at least one cell of interest and its/their nuclei using a convolutional machine learning model, for example a U-Net model.

According to one embodiment, the convolutional machine learning model had been previously trained using random data augmentation so that the convolutional machine learning model is robust to potential staining variations.

According to one embodiment, k is a predefined and constant natural number, allowing to improve for bag dimension consistency.

According to one embodiment, the at least two multi-instance learning models are an embedding-based multi-instance learning model using a pooling operator being a weighted-mean operator.

According to one embodiment, the at least two multi-instance learning model is trained using bootstrap aggregation.

According to one embodiment, the bladder cancer is an Urothelial Carcinomas.

According to one embodiment, the biological sample is a urine sample

According to one embodiment, the cells of interest are basal urothelial cells.

According to other advantageous aspects of the invention, the device comprises one or more of the features described in the following embodiment, taken alone or in any possible combination.

In addition, the disclosure relates to a computer program comprising software code adapted to perform a method for analysis of a digital cytology slide of a biological sample or a method for training compliant with any of the above execution modes when the program is executed by a processor.

The present disclosure further pertains to a non-transitory program storage device, readable by a computer, tangibly embodying a program of instructions executable by the computer to perform a method for analysis of a digital cytology slide of a biological sample or a method for training, compliant with the present disclosure.

Such a non-transitory program storage device can be, without limitation, an electronic, magnetic, optical, electromagnetic, infrared, or semiconductor device, or any suitable combination of the foregoing. It is to be appreciated that the following, while providing more specific examples, is merely an illustrative and not exhaustive listing as readily appreciated by one of ordinary skill in the art: a portable computer diskette, a hard disk, a ROM, an EPROM (Erasable Programmable ROM) or a Flash memory, a portable CD-ROM (Compact-Disc ROM).

DETAILED DESCRIPTION

Figure 1:
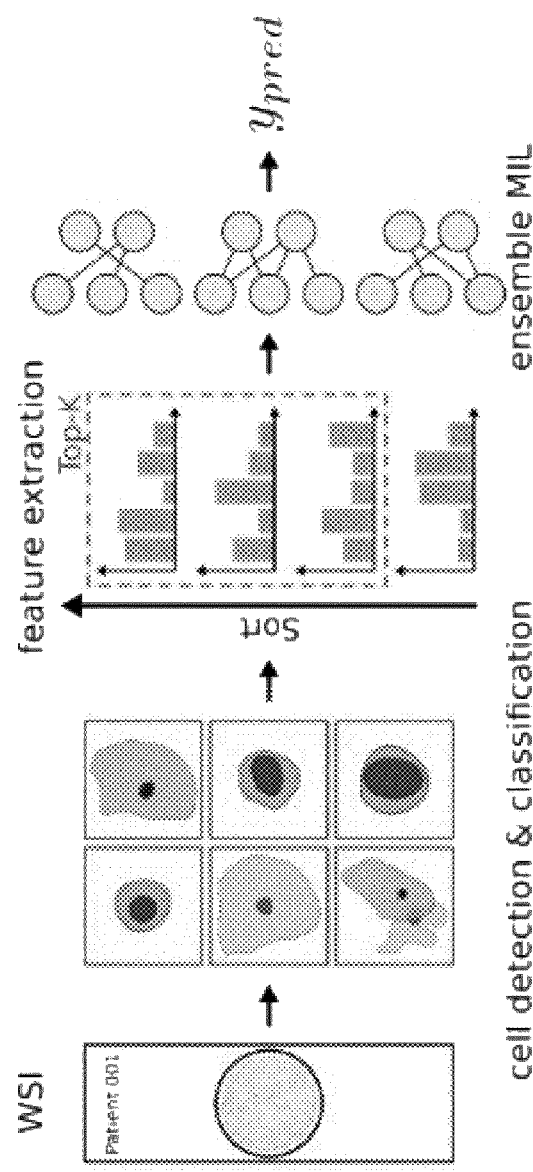
FIG. 1 is a general scheme giving an overview of one embodiment of the invention.

In the present invention, the following terms have the following meanings:

The terms "adapted" and "configured" are used in the present disclosure as broadly encompassing initial configuration, later adaptation or complementation of the present device, or any combination thereof alike, whether effected through material or software means (including firmware).

The term "processor" should not be construed to be restricted to hardware capable of executing software, and refers in a general way to a processing device, which can for example include a computer, a microprocessor, an integrated circuit, or a programmable logic device (PLD). The processor may also encompass one or more Graphics Processing Units (GPU), whether exploited for computer graphics and image processing or other functions. Additionally, the instructions and/or data enabling to perform associated and/or resulting functionalities may be stored on any processor-readable medium such as, e.g., an integrated circuit, a hard disk, a CD (Compact Disc), an optical disc such as a DVD (Digital Versatile Disc), a RAM (Random-Access Memory) or a ROM (Read-Only Memory). Instructions may be notably stored in hardware, software, firmware or in any combination thereof.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein may represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, a single shared processor, or a plurality of individual processors, some of which may be shared.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

This invention uses Multiple-instance (MI) learning, which is an alternative to the traditional supervised learning model. In MI Learning methods, learning examples are represented by a bag (i.e.; multiset) of instances instead of a single feature vector.

In typical machine learning problems such as image classification, it is assumed that an image clearly represents a category (a class). However, in many real-life applications multiple instances are observed and only a general statement of the category is given. This scenario is called multiple instance learning (MIL) or, learning from weakly annotated data. The problem of weakly annotated data is especially apparent in medical imaging (e.g., computational pathology, mammography or CT lung screening) where an image is typically described by a single label (benign/malignant) or a Region Of Interest (ROI) is roughly given. MIL deals with a bag of instances for which a single class label is assigned. Hence, the main goal of MIL is to learn a model that predicts a bag label.

MI Learning methods include, non limitatively: Instance based MIL such as MIWrapper, Embedded-based MIL such as for example ABMIL, TRANSMIL or wrapper algorithms such as MILES and SimpleMI, Dual Stream MIL, also referred to as DSMIL.

Instance-based MIL methods seek to predict first the label yi for each instance i, then deduce the global label from the collection of yi|i∈[1, k] obtained.

MIWrapper performs propositionalization by applying bag-level class labels to instances, and weighting the instances so that each bag has the same total weight. A single-instance model is built on the resulting dataset, and bag-level predictions are made by averaging the predicted probabilities of instances in a bag.

Embedding-based methods first construct a representation (embedding) of the bag from which the global label is predicted. Each MIL method is composed of a feature extractor f(x): R d→R d', a classifier g(h): R d'→R and a permutation-invariant pooling operator σ.

ABMIL method used in the present invention is an attention-based MIL implementing embedding for which the pooling operator is a weighted-mean operator: σ·f(X)=PNi=1 aihi, where hi=f(xi) and ai is the attention score associated with instance i, learnt by the model from hi. ai=exp {wT.

TransMIL is an embedding-based method relying on self-attention layers from Transformers to compute instances' attention scores with reference to all the other instances in the bag. Unlike previous methods, an instance importance is then judged using pairwise comparison with all other instances in the bag.

Multiple-instance Learning via Embedded Instance Selection (MILES) is a recent MI learning approach which transforms MI data into a propositionalized form, to which a 1-norm support vector machine (SVM) classifier is applied. MILES embeds bags into a single-instance feature space. MILES uses a symmetric assumption, where multiple target points are allowed, each of which may be related to either positive or negative bags.

SimpleMI performs propositionalization by averaging the attribute values of the instances in each bag, and appending the bag's class label to the resulting feature.

Interestingly, the SimpleMI methods only generate one instance for each training bag, without increasing the dimensionality of the feature space. For example, MIWrapper generates one instance for every instance in every bag, leaving the dimensionality of the feature space unchanged. In contrast, if MILES also generates one instance per training bag, the dimensionality of the feature space is almost always much higher, as the number of attributes is equal to the total number of instances in the training bags.

The Dual-Stream MIL method combines both instance-based and embedding-based approaches. An instance-based max-pooling branch is used to predict a malignancy score for each instance, the instance with the highest score is kept as the critical instance. A second embedding-based branch uses the weighted-mean operator as σ, where attention scores ai are computed as distances to the critical instance. The prediction is the mean of each branch output.

In one embodiment, all methods used in this invention include instance selection and an ensembling or bootstrap aggregating approach.

In one embodiment, the method of the invention may implement ensembling: because MIL methods are weakly-supervised methods, obtained predictions can be variable and are usually evaluated with multiple repetitions per experiment. To mitigate this variability, ensembling is used during inference: N individual MIL models are trained on N independent subsets of the training data, and the raw predictions are averaged.

In one embodiment, the method of the invention may implement bootsrap aggregating: bootstrap aggregating, also known as bagging, is an ensemble machine learning technique used to improve the stability and accuracy of machine learning models. It works by combining multiple models built on different samples of the training data to produce a single, more robust model. The idea behind bagging is to reduce the variance of a model, which can occur when the model is overfitting to the training data. By training multiple models on different samples of the training data, bagging helps capturing the underlying structure of the data more accurately. In bootstrap aggregating, the training data is randomly sampled with replacement to create multiple training sets. A separate model is then trained on each of these training sets. The final prediction is made by combining the predictions from each of the models. This can be done by taking a majority vote in the case of classification problems, or by averaging the predictions in the case of regression problems.

EXAMPLE

The present invention is further illustrated by the following example.

Example

A standardized urine cytology creation protocol has been standardized for the VisioCyt 1 MD:
  Chemical fixation: Hologic Cytolyt
  Centrifugation
  Cellular Resuspension: Hologic Preservcyt
  Cell Deposit: Hologic Thinprep (10 mm circle spot)
  Staining: Papanicolaou Staining
  Slide mounting: Sakura film.

Slides are digitized with a Hamamatsu NanoZoomer® S360, along 3 to 5 focal planes (×40, 0.23 µm/pixel). 731 patients' slides (268 Negative, 233 LGUC, 230 HGUC) are used for training, the remaining patients (141 Negative, 76 LGUC, 75 HGUC) are kept for the Test set.

1. Detection of cells of interest in WSI: the considered thin-layered urine cytology WSI are colored with Papanicolaou staining, making isolated stained foreground objects easily identifiable from the background. Foreground objects are defined as connected components detected by Otsu's automated threshold with an area in the range 1200-90,000 pixels at full resolution. Foreground objects are detected from the central focal plane of the slide, then a crop containing each foreground object is extracted from the WSI at the sharpest focal plane computed using the variance of Laplacian operator. A ResNet-18 model is trained to classify all foreground objects crops into 5 classes: basal urothelial cells (BUCs), superficial urothelial cells, conglomerates (at least two touching objects), polynuclear neutrophils and others, based on more than 25,000 annotated crops.

In this example, only BUCs are considered and all other objects are discarded.

Computation of expert feature vectors: handcrafted feature vectors are computed for each BUCs. These features are called expert because they are inspired from the features described in the Paris System. Those features are the Nuclear-Cytoplasm Ratio (NCR), the Nucleus Intensity, four nucleus texture features: the Nucleus Intensity standard deviation and Haralick's Energy, Entropy and Homogeneity, and two nucleus morphology features: the convex-hull ratio and the nucleus circularity. The computation of these expert features relies on a precise segmentation of the cells and their nuclei. To do so, a U-Net model trained on more than 11,000 cells with annotated nucleus masks. In this example, to ensure nucleus masks predicted by the U-Net model are robust to potential staining variations, random data augmentations including color and intensity jittering, flips, rotations and cropping are used during training.

3. Prediction of the global diagnosis: Multiple Instance Learning (MIL) is a weakly-supervised learning method designed to predict a label from a bag of instances, and is well adapted to the problem of predicting a diagnosis score from a collection of BUCs. In this study, MIL is used for binary classification (negative or positive for urothelial carcinoma), i.e the model aims to predict a diagnosis score $y \in [0, 1]$ from a bag of N instances $X = \{x1, x2, \ldots, xk\}$. The label yi of each instance $i \in [1, k]$ is not available. MIL framework hypothesis is that a bag is positive if containing at least one positive instance.

3. Bag creation: While MIL approaches can handle bags with a variable number of instances, in this work the number k of instances in a bag is fixed for bag dimension. We propose to select the k most atypical BUCs in each digital slide to build the bags. According to the Paris System, the NCR is the most important criterion for BUCs atypia, hence all BUCs in a WSI are sorted by decreasing NCR and the first k BUCs are included in the bag. Besides the computational interest, this approach is motivated by the following: for both positive and negative slides, sufficient information is contained in the "most positive" instances. For positive slides, healthy cells tend to be removed from the analysis, increasing attention on atypical BUCs. On the other hand, for negative slides, more importance is given to slightly atypical but healthy BUCs, acting as hard-mining which could help reduce false positives. In cases where the slide contains less than k BUCs, all BUCs are selected and the bag is zeropadded to keep the bag size constant. After evaluation in cross-validation, the value k=300 is used in the following.

4. MIL method: The present example uses an approach relies on the attention based MIL method which is also embedding-based and for which the pooling operator is a weighted-mean operator: $\sigma \circ F. (X) = E_{i=1}^{N} a_i h_i$, where $h_i = f(x_i)$ and $a_i$ is the attention score associated with instance i, learnt by the model from $h_i$.

$$a_i = \frac{\exp\{w^T(\tanh V h_i^T \odot sigm(U h_i^T))\}}{\sum_{j=1}^{N} \exp\{w^T(\tanh V h_j^T \odot sigm(U h_j^T))\}}$$

Figure 2:
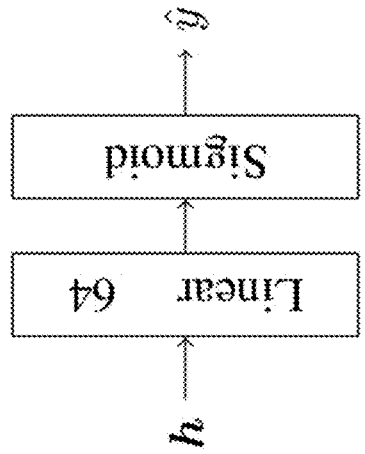
FIG. 2 show the architecture of an example of feature (a) extractor f and (b) classifier g used.
Figure 2:
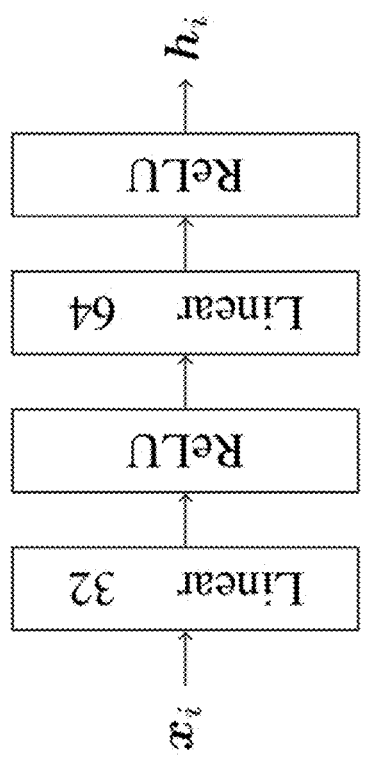

The feature extractor f and classifier g are shown on FIG. 2.

Ensemble MIL: Because MIL methods are weakly-supervised methods, obtained predictions can be variable and are usually evaluated with multiple repetitions per experiment. To mitigate this variability, ensembling is used during inference: N individual MIL models are trained on N independent subsets of the training data, and the raw predictions are averaged. Each subset is composed of (N−1)/N of the whole train dataset and is computed similarly to a N-fold cross-validation, meaning each sample is in N−1 out of the N training subsets. Let $y_i$ be the prediction of a single MIL model, the ensembled prediction $y_{pred}$ is obtained as $y_{pred} = E_{j=1}^{N} \hat{y}_j$. In the following we use N=6.

Results

Diagnostic performances: Diagnostic performances are evaluated on Test set patients using accuracy, sensitivity, specificity and ROC-AUC, averaged over 5 repetitions of the experiment, and compared against experts diagnosis. Following the Paris System, slides labeled C2 by the experts are negative, and slides labeled C4, C5 or C6 are considered positive. When slides contains not basal urothelial cells to establish a diagnosis, the slide is rejected and labeled C1. Moreover, the Paris System contains a C3 class corresponding to atypical slides, containing some atypical cells but not enough to be classified as suspicious for HGUC. This C3 label can then be considered as the uncertain class. In the proposed approach, slides are automatically rejected if less than 10 basal urothelial cells are detected, and a slide is labeled uncertain when the diagnosis prediction lies between 0.45 and 0.55. Doing so, the proportion of rejected and uncertain slides returned by our method match the proportion of C1 and C3 slides labeled by the experts. Performances computed on slides neither rejected nor uncertain are reported Table 1.

TABLE 1

Diagnostic performances of the proposed
method and of experts, for the Test set.

|  | Acc. | Sensi. | Speci. | % uncertain | % rejected |
|---|---|---|---|---|---|
| Experts | 0.758 | 0.515 | 1.0 | 0.064 | 0.048 |
| Proposed | 0.775 | 0.758 | 0.791 | 0.043 | 0.034 |

This experiment shows the proposed approach is able to diagnose bladder cancer with higher accuracy and sensitivity but lower specificity than experts. It should however be noted that in the clinical trial VisioCyt®, negative patients cannot have positive cytology (C4, C5 or C6): expert's specificity is 100% by construction and surely overestimated.

The model predictions are also analyzed for the different patients sub-groups: Negative, LGUC and HGUC and reported Table 2. Most errors are made on LGUC patients, which are known difficult to detect using urine cytology.

TABLE 2

Model predictions on the Test set w.r.t. the patient sub-group. Predictions counts are averaged over 5 repetitions of the experiment.

| Sub-group | ypred < 0.5 | Ypred >= 0.5 |
|---|---|---|
| Negative | 107.6 ± 1.4 (78.5%) | 29.4 ± 1.4 (21.5%) |
| LGUC | 25.6 ± 1.0 (34.6%) | 48.4 ± 1.0 (65.4%) |
| HGUC | 9.8 ± 0.4 (13.8%) | 61.2 ± 0.4 (86.2%) |

TABLE 3

MIL models performances evaluated on the Test set and averaged for 5 repetitions of the experiment. ABMIL model is found to perform best.

| model | accuracy | sensitivity | specificity | AUC |
|---|---|---|---|---|
| Maxpool (inst.) | 0.702 ± 0.008 | 0.666 ± 0.025 | 0.737 ± 0.022 | 0.770 ± 0?011 |
| Avgpool (inst.) | 0.744 ± 0.000 | 0.655 ± 0.000 | 0.832 ± 0.000 | 0.796 ± 0.000 |
| Maxpool (emb.) | 0.738 ± 0.002 | 0.712 ± 0.003 | 0.765 ± 0.007 | 0.811 ± 0.002 |
| Avgpool (emb.) | 0.745 ± 0.003 | 0.695 ± 0.005 | 0.796 ± 0.005 | 0.800 ± 0.000 |
| DSMIL | 0.699 ± 0.009 | 0.676 ± 0.008 | 0.721 ± 0.014 | 0.771 ± 0.006 |
| TransMIL | 0.757 ± 0.007 | 0.719 ± 0.010 | 0.796 ± 0.018 | 0.814 ± 0.004 |
| ABMIL | 0.771 ± 0.004 | 0.756 ± 0.007 | 0.785 ± 0.010 | 0.824 ± 0.002 |

Figure 3:
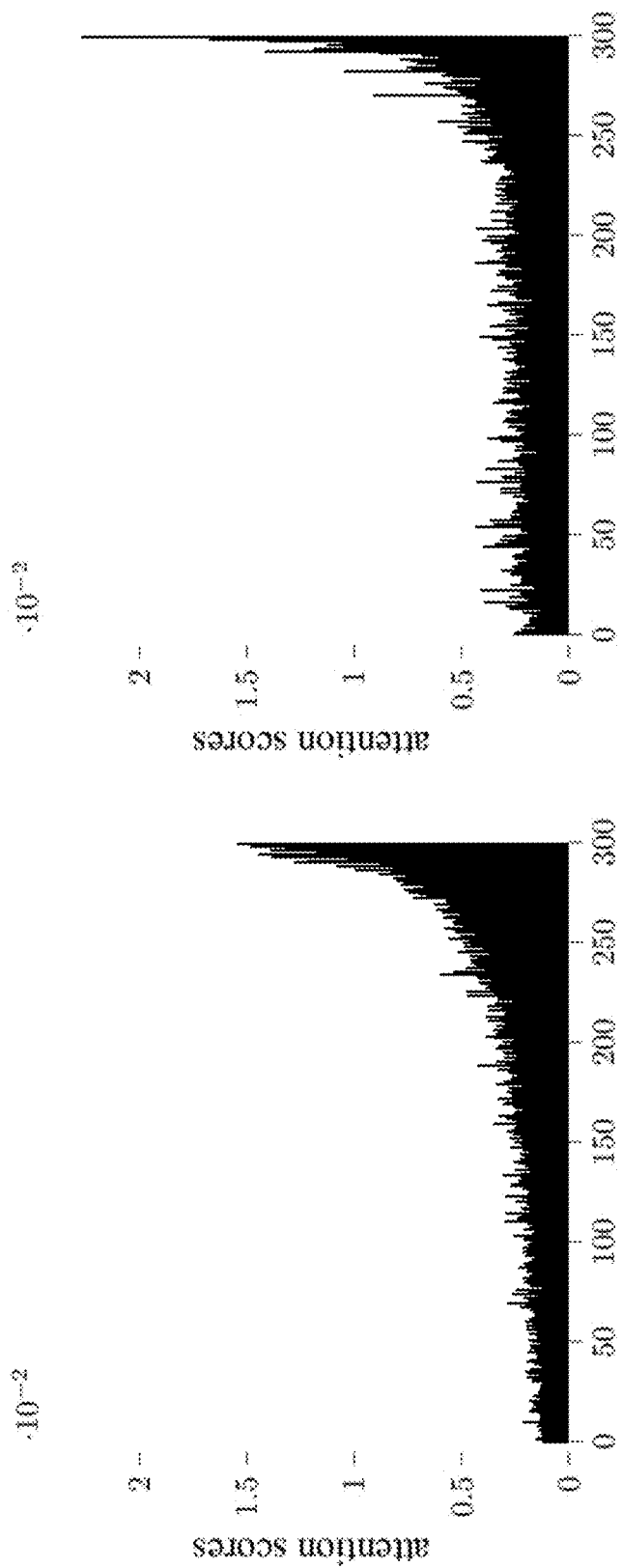
FIG. 3 shows averaged attention scores over respectively (a) all positive and (b) all negative Test slides, for instances ordered by increasing NCR. In both cases, cells with higher NCR tends to have higher attention scores.

Attention scores interpretation: The analysis of ABMIL's attention scores for one slide allows to visualize cells contributing the most to the bag embedding, and thus to the prediction. The analysis of attention scores, averaged for multiple slides and w.r.t to some expert feature can also help to understand how the ABMIL model uses such features for the prediction. Averaged attention scores for bags of instances ordered by increasing NCR are illustrated FIG. 3.

In average, for both positive and negative slides, basal urothelial cells with higher NCR tends to have higher attention scores with the ABMIL method. Larger NCR being the most important atypia criterion in the Paris System, this indicates the attention mechanism in ABMIL indeed tends to give more importance to the most atypical cells in a slide to predict a malignancy score. This observation also comforts the intuition that selecting the most atypical cells, based on expert knowledge, to form bags is relevant for MIL models.

Comparison and Ablation Studies:

MIL methods: The ABMIL method is compared against common baselines and two recent MIL methods with interesting properties.

Baselines: Considered baselines methods relies on average or maximum pooling operators for $\sigma$. They are declined as instance-based or embedding-based, depending if the pooling operator $\sigma$ is applied before or after the classifier g.

DSMIL: The Dual-Stream MIL method combines both instance-based and embedding-based approaches. An instance-based max-pooling branch is used to predict a malignancy score for each instance, the instance with the highest score is kept as the critical instance. A second embedding-based branch uses the weighted-mean operator as $\sigma$, where attention scores $a_i$ are computed as distances to the critical instance. The prediction is the mean of each branch output.

TransMIL: The TransMIL method is an embedding-based method relying on self-attention layers from Transformers to compute instances' attention scores w.r.t all the other instances in the bag. Unlike previous methods, an instance importance is then judged using pairwise comparison with all other instances in the bag. All methods use the proposed instance selection and ensembling approach, and share similar f and g (see FIG. 2).

Bag creation: To study the impact of the proposed instance selection approach, performances of the ABMIL model are evaluated on the Test set using bags containing top-300 atypical cells and 300 randomly drawn cells. Results are reported Table 4.

TABLE 4

Diagnostic performances for the method, evaluated on the Test set for 5 repetitions of the experiment, w.r.t. the instance selection method.

| Bag creation | accuracy | sensitivity | specificity | AUC |
|---|---|---|---|---|
| Random - 300 | 0.739 ± 0.006 | 0.728 ± 0.007 | 0.749 ± 0.006 | 0.812 ± 0.003 |
| Top-300 | 0.771 ± 0.004 | 0.756 ± 0.007 | 0.785 ± 0.824 | 0.824 ± 0.002 |

Figure 4:
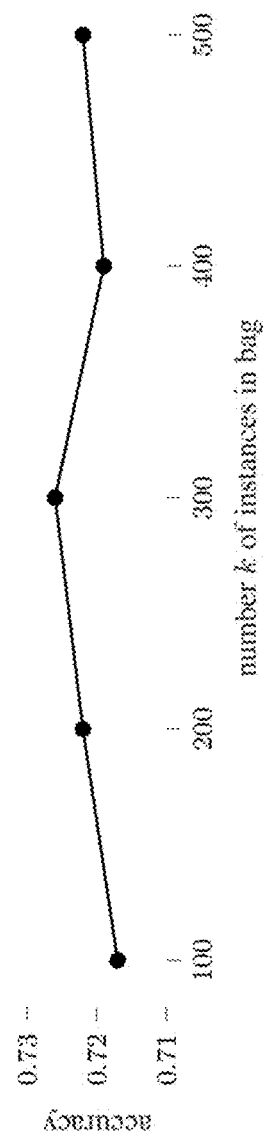
FIG. 4 illustrates ABMIL performances evaluated in cross-validation w.r.t. the number of instances k selected per bags.

The impact of the number of instances k selected in bags on ABMIL model performances, evaluated in cross-validation, is reported FIG. 4 for k ∈{100, . . . , 500}. The number of instances k is found to have low impact on diagnosis performances.

Ensembling: The impact of the number N of models used for ensembling is studied and compared against the special case N=1, where one model is trained on the full training dataset without ensembling (see Table 5). For low N, the ensembled models are trained on small train subsets, leading to lesser performances. For higher N, performances are found rather stable. To study the effect of ensembling in the case N=1, the 5 models obtained through experiment repetition are ensembled as in the paragraph related to Ensemble MIL. This experiment suggests that ensembling leads to performance gains when ensembled models are trained on independent train subsets.

TABLE 5

ABMIL performances on Test set w.r.t. to N. All models are randomly initialized. The experiment is reproduced 5 times.

| N | accuracy | sensitivity | specificity | AUC |
|---|---|---|---|---|
| 1 | 0.759 ± 0.014 | 0.759 ± 0.014 | 0.759 ± 0.015 | 0.820 ± 0.008 |
| 1* | 0.759 | 0.759 | 0.759 | 0.823 |
| 2 | 0.756 ± 0.014 | 0.739 ± 0.013 | 0.772 ± 0.017 | 0.815 ± 0.005 |
| 4 | 0.755 ± 0.007 | 0.752 ± 0.010 | 0.758 ± 0.022 | 0.818 ± 0.002 |
| 6 | 0.771 ± 0.004 | 0.756 ± 0.007 | 0.785 ± 0.010 | 0.824 ± 0.002 |
| 8 | 0.766 ± 0.004 | 0.750 ± 0.003 | 0.781 ± 0.007 | 0.825 ± 0.001 |
| 10 | 0.766 ± 0.009 | 0.754 ± 0.007 | 0.778 ± 0.017 | 0.825 ± 0.004 |

*corresponds to ensembling performed using the 5 repetitions of the experiment for N = 1.

This example shows the efficiency of the developed method to predict the diagnosis status, obtained from gold-standard ground-truth, on a clinical trial dataset.

The invention claimed is:

1. A device for analysis of a digital cytology slide of a biological sample, said biological sample having been previously collected from a subject suspected to be suffering from bladder cancer, said device comprising:
   at least one input configured to receive at least one digital cytology slide obtained from a digitalization of at least one Whole Slide Image (WSI) of said biological sample;
   at least one processor configured to:
      detect cells of interest from said at least one digital cytology slide;
      for each cell of interest, compute a features vector comprising at least one feature calculated on each cell of interest;
      define a bag of k instances for each digital cytology slide; wherein the k instances are selected, based on at least one feature of said features vectors, as the cells of interest being the highest atypia cells among the cells of interest detected for each digital cytology slide;
      calculate a global prediction score representative of a probability of presence of bladder cancer and/or a stage of bladder cancer for said subject; said global prediction score being obtained from a combination of single prediction scores obtained from at least two multi-instance learning methods configured to receive as input said at least one defined bag; and
   at least one output configured to provide said global prediction score.

2. The device according to claim 1, wherein the at least one digitalized cytology slide is obtained from at least one WSI being colored with Papanicolaou.

3. The device according to claim 1, wherein the detection of the at least one cell of interest is performed using a trained Res-Net model configured to receive as input at least one pre-processed portion of the WSI, and provide as output an identification and a classification of objects present in said at least one pre-processed portion of the WSI as belonging or not to at least one class of cells of interest.

4. The device according to claim 1, wherein the at least one feature comprised in the features vector are selected among: Nuclear-Cytoplasm Ratio (NCR), Nucleus Intensity, Nucleus Intensity standard deviation, Haralick's Energy, Entropy, Homogeneity, convex-hull ratio and/or nucleus circularity.

5. The device according to claim 4, wherein the at least one feature is Nuclear-Cytoplasm Ratio (NCR) and wherein the selection of k cells of interest comprises:
   sorting the cells of interest by decreasing Nuclear-Cytoplasm Ratio values; and
   select the first k cells of interest, representative of high atypia basal urothelial cells.

6. The device according to claim 1, wherein the computation of the features vector comprises a preliminary segmentation of the detected at least one cell of interest and its/their nuclei using a convolutional machine learning model, for example a U-Net model.

7. The device according to claim 6, wherein said convolutional machine learning model had been previously trained using random data augmentation.

8. The device according to claim 1, wherein k is a predefined and constant natural number.

9. The device according to claim 1, wherein the at least two multi-instance learning models are an embedding-based multi-instance learning model using a pooling operator being a weighted-mean operator.

10. The device according to claim 1, wherein the at least two multi-instance learning model is trained using bootstrap aggregation.

11. The device according to claim 1, wherein the bladder cancer is an Urothelial Carcinomas.

12. The device according to claim 1, wherein the biological sample is a urine sample.

13. A computer-implemented method for analysis of a digital cytology slide of a biological sample, said biological sample having been previously collected from a subject suspected to be suffering from bladder cancer, said method comprising:
   receiving at least one digital cytology slide obtained from a digitalization of at least one Whole Slide Image (WSI) of said biological sample;
   detecting cells of interest from said at least one digital cytology slide;
   for each cell of interest, computing a features vector comprising at least one feature calculated on each cell of interest;
   defining a bag of k instances for each digital cytology slide; wherein the k instances are selected, based on at least one feature of said features vectors, as the cells of interest being the highest atypia cells among the cells of interest detected for each digital cytology slide; and
   calculating a global prediction score representative of a probability of presence of bladder cancer and/or a stage of bladder cancer for said subject; said global prediction score being obtained from a combination of single prediction scores obtained from at least two multi-instance learning methods configured to receive as input said at least one defined bag.

14. A non-transitory computer-readable storage medium comprising instructions which, when executed by a computer, cause the computer to carry out the method for analysis of a digital cytology slide of claim 13.

* * * * *